Patented Oct. 10, 1933

1,929,466

UNITED STATES PATENT OFFICE 1,929,466

METHOD OF MAKING SILVER THIOSULPHATE

James J. Bajda, South Orange, N. J.

No Drawing. Application March 27, 1929
Serial No. 350,453

8 Claims. (Cl. 23—115)

The production of silver sodium thiosulphate has been accomplished by evaporating a solution of silver chloride in the presence of sodium thiosulphate, or by adding a solution of silver nitrate to a solution of sodium thiosulphate to produce a precipitate which is made available by the addition of ethyl alcohol and subsequent filtering.

These processes or processes of similar nature are uneconomical and unsatisfactory for commercial use because of the difficulty of separating the resultant silver thiosulphate, which is soluble in water to a marked degree, is unstable, and possesses a marked tendency to decompose at high temperatures; and for other reasons that need not be gone into.

I have found, however, that alkali silver thiosulphate, in a state sufficiently pure for practical purposes, may be economically obtained by a reaction between reagents one or more of which has been melted: preferably a reaction between silver chloride and sodium thiosulphate which has been heated and thereby melted with little, if any, addition of water besides its own water of crystallization.

Having thus melted the desired quantity of sodium thiosulphate crystals, the silver chloride may be added thereto, whereupon, depending upon the degree of heat employed above the melting point (48° to 49° C.) of the thiosulphate, a rapid reaction takes place wherein the resultant silver sodium thiosulphate is produced in relatively pure crystalline form without decomposition, and may be readily separated from the cooled reaction mass by filtering or draining said crystalline product therefrom. It may then be dried at elevated temperatures without mechanical or chemical loss due to decomposition or other causes.

The use of a water bath has been found by me to be acceptable in melting the crystalline sodium thiosulphate in preparation for its use in the above reaction.

And I have also found it well to use silver chloride which has been freshly precipitated, and before using it to wash it free from soluble impurities by the use of water from which it may be separated either by decantation or filtration.

The damp silver chloride may be gradually but reasonably rapidly added to the completely molten sodium thiosulphate, the temperature of which should not exceed ninety-five to one hundred degrees centigrade; although if circumstances render it desirable the reaction may be carried out with satisfactory results by adding the molten sodium thiosulphate to the well drained or filtered precipitate of silver chloride. If the latter sequence of steps be employed it is preferable to add only a portion, say fifty per cent, of the requisite amount of molten sodium thiosulphate to the silver chloride, and, after thorough agitation, add the remainder of the molten sodium thiosulphate.

Adding a quantity of common salt, after the complete dissolution of the silver chloride, may serve, if necessary, to assist in completing the precipitation of the silver sodium thiosulphate, which then as previously explained may be filtered or drained off and dried.

Whether the molten sodium thiosulphate be added to the silver chloride, or the reverse order be followed, advantages may be gained by carrying out the reaction in a special reaction vessel such as a ball mill, the operation of which tends to produce the complete comminution of any lingering particles of silver chloride that might otherwise remain uncombined.

Regarding formula showing the reaction and the end products, it is difficult to write a single formula because the indications are that the reaction proceeds in a variety of ways and forms various silver thiosulphates. For example, when silver chloride (AgCl) reacts with molten sodium thiosulphate ($Na_2S_2O_3 5H_2O$), the silver of the silver chloride displaces in whole or in part the sodium of the sodium thiosulphate with resulting formation of silver thiosulphate and sodium chloride. Then the silver thiosulphate combines in varying proportions with other molecules of sodium thiosulphate which crystallize out or precipitate as a double salt having a greater or less number of molecules of water of crystallization combined therewith. However, analytical data indicate that the predominant silver thiosulphate produced by my foregoing process has substantially the formula $Ag_2S_2O_3 2Na_2S_2O_3 2H_2O$.

I claim:

1. The process of making a silver thiosulphate product which comprises causing a reaction between silver chloride and sodium thiosulphate in a molten state.

2. The process of making a silver thiosulphate product which comprises causing a reaction between a suitable silver salt and an alkali-thiosulphate in a molten state.

3. The process of making a silver thiosulphate product which comprises causing a reaction between a suitable silver salt and a sodium thiosulphate in a molten state to form a silver thiosulphate product, cooling the reaction mass to crystallize out the product, and mechanically separating the crystallized product from the remainder of the reaction mass.

4. The process of making a silver thiosulphate product which comprises heating together a suitable silver salt and molten sodium thiosulphate to a temperature, between the melting point of sodium thiosulphate and below about 95° C., suitable for forming the silver thiosulphate product.

5. The process of making a silver thiosulphate product which comprises heating together a suitable silver salt and molten sodium thiosulphate to a temperature, between the melting point of the thiosulphate and below about 95° C., suitable for forming the silver thiosulphate product, cooling the reaction mass to crystallize out the product, and mechanically separating it from the remainder of the reaction mass.

6. The process of making a silver thiosulphate product which comprises comminuting and agitating together a suitable silver salt and molten sodium thiosulphate heated to a temperature, between the melting point of the thiosulphate and below about 95° C., suitable for forming a silver thiosulphate product.

7. The process of making a silver thiosulphate product which comprises heating together a suitable silver salt and an alkali thiosulphate in a molten state until the silver salt is substantially completely dissolved, cooling the reaction mass to crystallize out the product, and adding a suitable quantity of common salt to the reaction mass to render more complete said crystallization.

8. The process of making a silver thiosulphate product which consists in causing a reaction to take place between silver chloride and an alkali-thiosulphate in a molten state, the silver chloride having first been washed substantially free of soluble impurities.

JAMES J. BAJDA.